United States Patent [19]

Goede

[11] Patent Number: 4,721,370

[45] Date of Patent: Jan. 26, 1988

[54] ADAPTIVE GAS LENS

[75] Inventor: Philip J. Goede, Canoga Park, Calif.

[73] Assignee: Rockwell International Corporation, El Segundo, Calif.

[21] Appl. No.: 248,736

[22] Filed: Mar. 30, 1981

[51] Int. Cl.$^4$ .............................. G02B 1/06; H01S 3/08
[52] U.S. Cl. .................................... 350/418; 350/419; 372/104
[58] Field of Search .................. 350/418, 419; 372/104

[56] References Cited

U.S. PATENT DOCUMENTS 3,413,059 11/1968 Berreman ............................. 350/418
3,521,190 7/1970 Schimitschek et al. ......... 350/418 X
3,528,727 9/1970 Halliday ........................... 350/419 X
3,731,991 5/1973 Arnold ............................. 372/104 X Primary Examiner—John K. Corbin
Assistant Examiner—Scott J. Sugarman
Attorney, Agent, or Firm—H. Fredrick Hamann; Harry B. Field; Lawrence N. Ginsberg

[57] ABSTRACT

An adaptive gas lens provides a radial flow of gas that makes phase corrections on a distorted annular wavefront passing therethrough. A flexible flange controlled by precision actuators provides for variation in gas stream width yielding variations in the optical path difference over a range of azimuthal periods.

8 Claims, 3 Drawing Figures

Fig. 1,

ADAPTIVE GAS LENS

BACKGROUND OF THE INVENTION

1. Field of the Invention

This invention relates to a gas lens for correcting wavefront distortions that degrade a laser's far-field irradiance. More specifically, it relates to an adaptive gas lens, based on a radial jet flow of heium or other low refractive index gas such as Argon or Krypton into another gas, such as air, which is capable of providing phase corrections for a distorted annular wavefront.

2. Description of the Prior Art

Both extra-cavity and intra-cavity wavefront distortions can degrade the far-field irradiance delivered on a target by a laser. The phase of a wave-front may be controlled by changing either the path length or the velocity of propagation. The optical path length may be adjusted by moving a reflective surface such as a deformable mirror or by passing the laser beam through a transparent bar in which intense sound waves have been established which thereby acts as a diffraction grating with the deflection of the beam being controlled by the frequency of the waves. However, these optics have severe performance requirements in terms of surface accuracy and cooling.

The velocity of propagation may be changed by varying the refractive index of a medium. For instance, previous variable refraction systems have employed different types of electro-optic and magneto-optic crystals in which the index of refraction is made to vary in a controlled manner. Such refractive devices have not been generally used because of the difficulty of inducing sufficiently large changes of refractive index in devices of practical size. Furthermore, these refractive wavefront correctors previously used have a high spectral absorption, and it is difficult to obtain sufficient uniformity in the bulk material without degrading its quality.

Gas lenses for correcting wavefront distortions are not known in the prior art. Gas, or aerodynamic windows, as disclosed in U.S. Pat. Nos. 4,112,388; 4,013,977; 3,973,217; 3,949,321; 3,918,800; 3,907,409; and 3,768,038 have been utilized in place of transparent window material for passing a laser beam from an area of low pressure to an area of higher pressure. These aerodynamic windows function merely as a transparent barrier to laser medium gases. The windows do not perform the functions of the present invention, i.e., correcting wavefront distortions, nor are they designed to accomplish these functions.

SUMMARY OF THE INVENTION

Accordingly, there is provided an adaptive gas lens that introduces a subsonic helium flow across the beam path with a width that varies periodically as a function of the azimuthal coordinate. The helium flow from the device mixes with the quiescent air as it flows across the beam path and enters a collector duct. Precision actuators are placed at equal intervals around the device to provide variations in helium stream width, allowing for variations in optical path difference with azimuthal period.

OBJECTS OF THE INVENTION

Therefore, an object of the present invention is to provide a gas lens which has no mechanical parts directly exposed to the annular wavefront, so that cooling of the hardware is not a problem for high-irradiance levels in the annular wavefront.

Another object of the present invention is to provide an adaptive gas lens in which very large or very small optical path differences are possible.

Yet another object of the present invention is to provide an adaptive gas lens in which rapid changes in the optical path difference may be made.

Still a further object of the present invention is to provide an adaptive gas lens for which either an optically noisy turbulent jet or a quiet laminar jet can be obtained.

Another object of the present invention is to provide an adaptive gas lens that utilizes a subsonic flow of gas avoiding the occurrence of shock waves.

Yet another object is to provide an adaptive gas lens that is simple and inexpensive to fabricate with noncritical fabrication tolerances.

Other objects, advantages and novel features of the present invention will becomes apparent from the following detailed description of the invention when considered in conjunction with the accompanying drawings.

BRIEF DESCRIPTION OF THE DRAWINGS

The same elements or parts throughout the figures of the drawings are designated by the same reference characters.

DETAILED DESCRIPTION OF THE PREFERRED EMBODIMENTS

Figure 1:
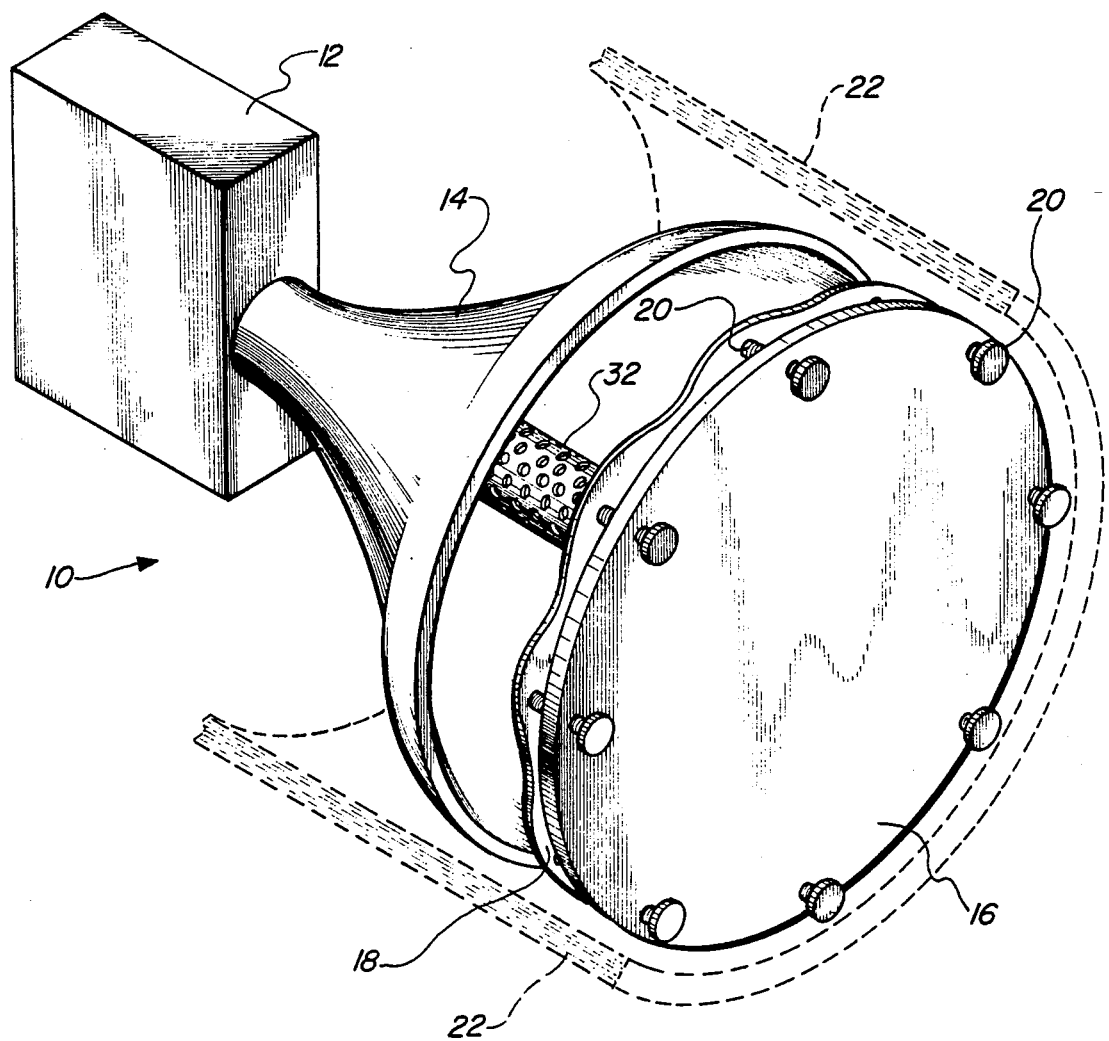
FIG. 1 is a perspective view of the adaptive gas lens.
Figure 2:
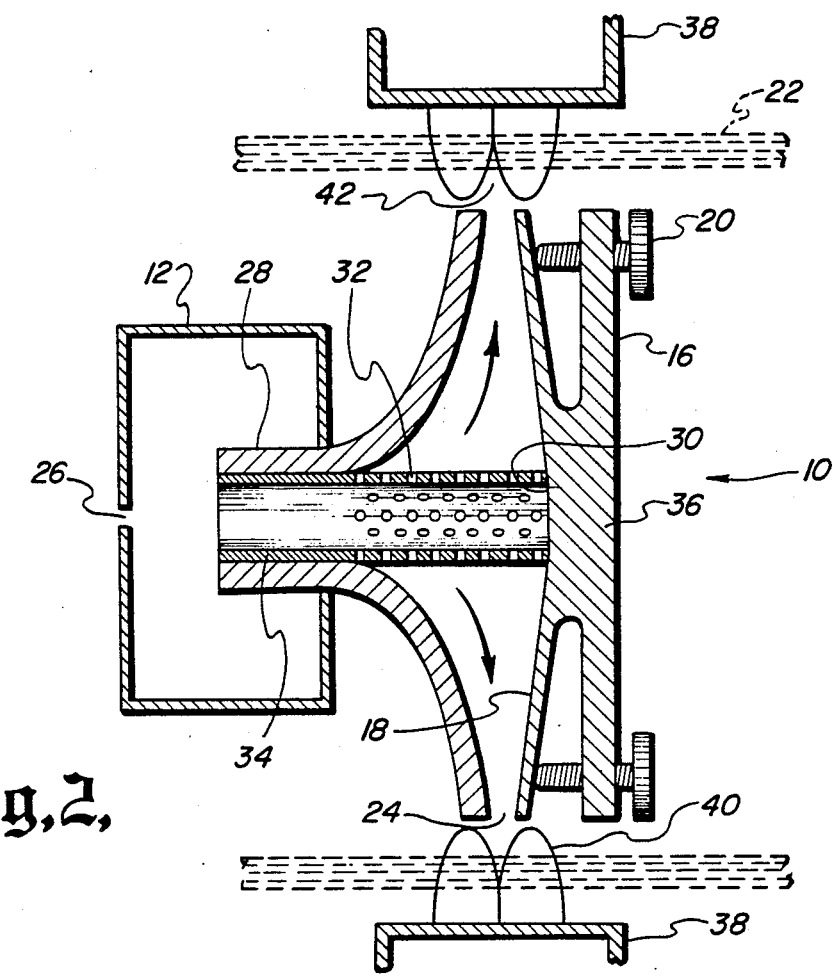
FIG. 2 is a cross-sectional view taken along line 1—1 of FIG. 1 and includes a collector encircling the gas lens.

The adaptive gas lens of the present invention, generally designated 10, includes a plenum chamber 12, a horn-shaped member 14, a fixed wall 16, a flexible flange 18, and actuators 20. The gas lens 10 as shown is designed for an annular wavefront 22 which, for convenience, is considered to be progressing from left to right in the Figures. In actuality, it could alternatively be progressing in the opposite direction. The gas is directed outward radially through a 360° gas feed channel 24. However, the concept presented herein of correcting wavefront distortions by a gas lens is not to be limited to annular wavefronts. A solid laser wavefront may be directed through any portion of the gas flow of the lens, or the device may be redesigned to provide a narrow stream of gas generally in the same direction.

A flow of a first gas, helium or any other low refractive index gas such as Argon or Krypton, is directed into the plenum chamber 12 through an orifice 26. The horn-shaped member 14 is cylindrical, defining a conduit which becomes increasingly larger downstream (as the wavefront progresses). The smaller, or upstream, portion 28 of the horn-shaped member 14 is integrally connected with the plenum chamber 12 so as to permit helium to flow from the plenum chamber 12 into horn-shaped member 14.

The fixed wall 16 is mounted on a downstream end 30 of a connecting porous tube 32. An upstream end 34 of the connecting porous tube 32 is integrally connected to the upstream portion 28 of the horn-shaped member 14.

The fixed wall 16 includes circular flexible flange 18 attached generally at a center portion 36. Actuators 20 are adjustably mounted within the fixed wall 16 and are juxtaposed with flange 18. The flange 18 may be constructed of aluminum, plastic, or any other material which would be deformable when force from actuators 20 is applied. A collector 38 may be positioned radially outward from the gas feed channel 24.

In operation, a gas such as helium is introduced under pressure into plenum chamber 12, after which the gas flows into the upstream portion 28 of the horn-shaped member 14 by passing through the porous tube 32. The gas then flows outward through the gas feed channel 24. As the gas exits gas feed channel 24 it mixes with a second gas, e.g., quiescent air, to form the mixing region 40. The gas mixture is continually drawn off by collector 38 so as to prevent the used gas for combining with the quiescent air to bias the refractive effect on wavefront 22. The collector 38 may be any conventional low pressure system typically used in gas lasers. However, in certain situations such as outside the atmosphere or simply in an unenclosed area, the collector 38 is not required for effective use of the present invention.

The mixing of the helium gas with the surrounding air forms a mixing region 40 in the shape of a double hump with the helium gas occuping the center area 42. The mixing region 40, as well as the center area 42 within, combine to provide the refractive medium for the annular wavefront 22. If the surrounding air is not available, i.e., the lens 10 is in a vacuum, the helium gas flowing from flow channel 24 alone provides a refractive medium. Alternatively, air may be supplied from a secondary source such as a pump that directs air across flow channel 24 so as to mix with the helium exiting therefrom.

The width of the gas flow through flow channel 24 may be changed by activating independent actuators 20 which position flange 18. The changing of the width of gas flow thereby changes the dimensions of the mixing region 40 and center area 42 which changes the refractive properties of the lens. If the width of gas flow through flow channel 24 may be predetermined and adjustability is not required, actuators 20 may be omitted from the lens described herein. Furthermore, actuators 20 may be interconnected to a master actuator (not shown) such that when the master actuator is adjusted, each individual actuator 20 will be correspondingly equally adjusted.

Actuators 20 may vary in number according to design requirements. For example, if twelve actuators were selected and placed at equal intervals around the fixed wall 16, variations in the optical path difference with azimuthal period as small as 60° would be obtained.

Aberrations present in optical systems are commonly treated in terms of the circle polynomials of Zernike, expressed as a series expansion of the form $$\Phi = \Sigma_{l,m} a_{l,m} R_l(r) \cos m\theta$$

where $\Phi$ is the wave aberration, $R_l(r)$ are polynomial functions of the radial coordinate r, $\theta$ is the azimuthal coordinate, $a_{l,m}$ is a constant, and l and m are integers. For example, terms of the form $(6r^4 - 6r^2 + 1)$ represent spherical aberration, terms of the form $r^2(2 \cos 2\theta - 1)$ represent astigmatism, etc.

Figure 3:
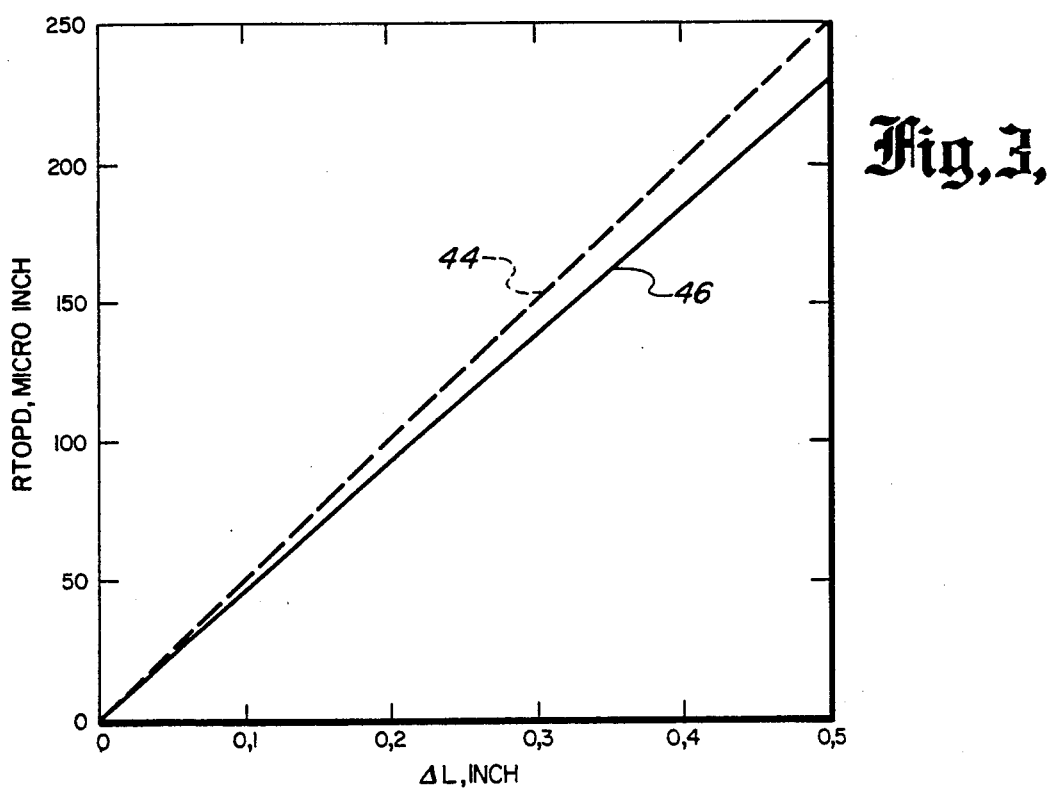
FIG. 3 is a graph of the round-trip optical path difference of a wavefront versus the width of the gas flow of the adaptive gas lens.

The beam quality performance of annular laser resonators is particularly sensitive to azimuthal variations in the wave aberration function. It is for this application that the azimuthal connection capabilities of the adaptive gas lens 10 would be particularly useful. By introducing a corrective azimuthal variation in the flow channel 24 width via the flexible flange 18 and actuators 20, a corresponding corrective variation may be produced in the optical path difference (OPD) for an annular wavefront 22 passing through the flow channel 24:

$$OPD = \Delta L \left\{ \left[ \frac{\rho}{M} K(n_o - 1) \right]_{Air} - \left[ \frac{\rho}{M} K(n_o - 1) \right]_{He} \right\}$$

where $\Delta L$ is the flow channel width, $\rho$ the density, M the molecular weight, K the Gladstone-Dale constant, and $n_o$ the index of refraction at some reference condition. FIG. 3 is a plot of this equation for typical conditions showing the width required to obtain a particular value of round-trip optical path difference (RTOPD) for two limiting cases. The RTOPD in micro-inches is plotted against flow channel 24 width in inches. The two limiting cases considered are for nozzle pressure ratios equal to unity designated as the dashed line 44, and the critical ratio designated as the solid line 46. About 0.4 inches of helium width is required to obtain an RTOPD value of 200 micro-inches.

When the flow is on, it may be desirable to rapidly vary the OPD. This can be achieved by varying the helium plenum pressure or by mixing the helium with another gas, such as air. A desirable goal for the time it takes to go from one OPD to another is 100 milliseconds or less. A characteristic time, T, for such a process is $$T = L/a$$

where L is a characteristic dimension and a is the speed of sound. For helium at 300 K., $a = 1.02 \times 10^5$ cm/sec, while for air at the same temperature, $a = 3.47 \times 10^4$ cm/sec. For T = 100 milliseconds, it is seen that L is of order $10^4$ cm. Considering that the radius of the converging section leading to flow channel 24 is about 5 cm., equilibrium can easily be reached in the time allowed.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A device for altering the optical path length of a light beam comprising:
   means for injecting a gas across the path of a light beam, said injection means comprising a horn member and a wall member spaced from the wide end of the horn member, said horn member and wall member defining a gas feed channel with an adjustable dimension so that the adjustable dimension of the gas feed channel can be varied as desired,
   said wall member comprising a circular rigid plate, a circular movable plate affixed centrally to said rigid plate between the rigid plate and the horn member, and adjustment means for changing the space between the movable plate and the periphery of the horn member.

2. A device as in claim 1, wherein:

the adjustment means is spaced at intervals around the peripheral region of the movable plate.

3. A device as in claim 1, wherein the adjustment means comprises at least one screw supported by the rigid plate and having one end in contact with the movable plate.

4. A device as in claim 1, wherein:
said injection means further includes a cylindrical member having perforations in the wall thereof toward one end the cylindrical member being located within the horn member so that the perforated region lies in the flaring region of the horn member and directs the gas flow into the space defined by the horn member and the movable plate.

5. A device as in claim 1, including:
collector means for removing the gas after it has traversed the region in which the light beam is propagating.

6. A device as in claim 1, wherein:
the adjustment means is spaced at intervals around the peripheral region of the movable plate and the adjustments may be accomplished independently at a plurality of locations.

7. A device as in claim 1, wherein:
the movable plate is formed from flexible material, at least in the region which is associated with the adjustment means.

8. A device as in claim 1, wherein:
at least the peripheral region of the movable plate is formed from flexible material so that the flexible region can be moved by the adjustment means towards or away from said horn member.

* * * * *